(12) United States Patent
Uchida (10) Patent No.: US 11,429,082 B2
(45) Date of Patent: Aug. 30, 2022

(54) PARAMETER MANAGEMENT APPARATUS AND PARAMETER MANAGEMENT SYSTEM

(71) Applicant: FANUC Corporation, Yamanashi (JP)

(72) Inventor: Satoshi Uchida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 153 days.

(21) Appl. No.: 16/904,567

(22) Filed: Jun. 18, 2020

(65) Prior Publication Data

US 2020/0409330 A1    Dec. 31, 2020

(30) Foreign Application Priority Data

Jun. 28, 2019 (JP) .............................. JP2019-121888

(51) Int. Cl.
*G05B 19/402* (2006.01)

(52) U.S. Cl.
CPC .. *G05B 19/402* (2013.01); *G05B 2219/50174* (2013.01)

(58) Field of Classification Search
CPC .. G05B 19/402; G05B 19/409; G05B 19/418; G05B 2219/35398; G05B 2219/36088; G05B 2219/36089; G05B 2219/37081; G05B 2219/50174; Y02P 90/02
See application file for complete search history.

(56) References Cited

U.S. PATENT DOCUMENTS

| 2008/0250359 | A1  | 10/2008 | Sagara et al. |
| 2010/0023156 | A1* | 1/2010  | Trepina ................ G05B 19/406 700/175 |
| 2010/0063608 | A1* | 3/2010  | Miller .................. G05B 19/409 700/97 |
| 2011/0166693 | A1* | 7/2011  | Nishibashi ......... G05B 19/4086 700/187 |
| 2013/0222391 | A1* | 8/2013  | Tezuka .................... G06T 11/20 345/440.1 |
| 2017/0344201 | A1* | 11/2017 | Furihata .............. G06F 3/04847 |
| 2019/0361467 | A1* | 11/2019 | Fujita ....................... G05D 3/12 |

FOREIGN PATENT DOCUMENTS

| JP | 20056450 A    | 1/2005  |
| JP | 2008257366 A  | 10/2008 |

\* cited by examiner

*Primary Examiner* — Kidest Bahta
(74) *Attorney, Agent, or Firm* — Hauptman Ham, LLP (57) ABSTRACT

A numerical controller according to the present invention stores comparative relationship between parameters related to setting of the numerical controller, extracts data having comparative relationship among parameters related to the setting of the numerical controller based on the stored comparative relationship, and causes a display to display the data having the comparative relationship in association with each other.

16 Claims, 12 Drawing Sheets

| FUNCTION | PARAMETER | PARAMETER VALUE | |
| --- | --- | --- | --- |
| | | COMPARISON TARGET 1: X1 | COMPARISON TARGET 2: X2 |
| FUNCTION A | PARAMETER A | 1000 | 1000 |
| | PARAMETER B | 2000 | 3000 |
| FUNCTION B | PARAMETER C | 3000 | 3000 |
| ... | ... | ... | ... |

| B1 | B2 | B3 | B4 |

FIG.4

| FUNCTION | PARAMETER | COMPARISON TARGET 1:X1 | COMPARISON TARGET 2:X2 | COMPARISON TARGET 3:Z1 | COMPARISON TARGET 4:A1 | COMPARISON TARGET 5:B1 |
|---|---|---|---|---|---|---|
| | PARAMETER | 1000 | 1000 | 1000 | 1000 | 1000 |
| FUNCTION A | PARAMETER A | 2000 | 3000 | 2000 | 2000 | 2000 |
| | PARAMETER B | 3000 | 3000 | 3000 | 3000 | 4000 |
| FUNCTION B | PARAMETER C | ⋮ | ⋮ | ⋮ | ⋮ | ⋮ |
| | ⋮ | ⋮ | ⋮ | ⋮ | ⋮ | ⋮ |
| | ⋮ | ⋮ | ⋮ | ⋮ | ⋮ | ⋮ |

| IDENTIFICATION NUMBER | MODEL NUMBER | COLLECTION TIME | OPERATION QUALITY | AXIS | PARAMETER A | PARAMETER B | ... |
|---|---|---|---|---|---|---|---|
| 001966 | 0i-ModelF | 2019/5/12 11:41:53 | HIGH QUALITY | X AXIS | 1000 | 1000 | ... |
| | | | | Y AXIS | 2000 | 3000 | ... |
| | | | | ... | ... | ... | ... |
| 021580 | 31i-ModelB5 | 2019/6/23 17:10:01 | LOW QUALITY | X AXIS | 3000 | 3000 | ... |
| | | | | ... | ... | ... | ... |
| ... | ... | ... | ... | ... | ... | ... | ... |

PARAMETER MANAGEMENT APPARATUS AND PARAMETER MANAGEMENT SYSTEM

RELATED APPLICATION

The present application claims priority to Japanese Patent Application Number 2019-121888 filed on Jun. 28, 2019, the disclosure of which is hereby incorporated by reference herein in its entirety.

BACKGROUND OF THE INVENTION

1. Field of the Invention

The present invention relates to a parameter management apparatus and a parameter management system.

2. Description of the Related Art

Numerical controllers involve a huge number of parameters. Types of such parameters include a general setting parameter, a system configuration parameter, an axis control parameter, a coordinate system parameter, a stroke confirmation parameter, a feed speed parameter, an acceleration/deceleration parameter, a servo parameter, a data input/output parameter and a screen display parameter. As described above, not only are there many types of parameters, but also the configuration of parameters is complicated. Thus, it is extremely cumbersome for an operator or a programmer to visually confirm the contents of the parameters one by one.

JP 2008-257366 A discloses a numerical controller that displays programs of a plurality of paths in parallel on the same screen for checking multi-path numerical control programs. In this numerical controller, a technology is used for allowing synchronous control programs of multiple axes to be synchronized and checked on the same screen, by relatively moving a cursor on a program screen displayed on one path and a cursor on a program screen of another path so as to be aligned on the same row. The numerical controller in this publication performs visual expression of synchronization relationships between programs by simultaneously displaying the programs based on sequence numbers described in the programs.

JP 2005-6450 A discloses a parameter change history display method for a motor controller, the method including steps of comparing a parameter value stored in advance with a current parameter value and displaying a parameter update history that covers all different parameter items.

When an operator or a programmer sets parameters or checks values using a numerical controller, the parameters are compared for each path, axis and function, and the settings are copied as necessary. The operation performed while comparing the data can be cumbersome and take a considerable time. In addition, when a change has been made that is not intended by the operator or the programmer or when the operation on only one axis is abnormal, the operator or the programmer needs to compare parameter values to find out the problem in the settings. However, with conventional numerical controllers, comparison between the parameter values is not easy. Furthermore, when a new axis is added, it is not easy to copy the set values for the existing axis to the new axis.

In addition, a technology of comparing previously recorded data with new data and displaying an update history is a common technology for tools such as editors. However, while a display method for displaying a change history as it is makes it possible to check which parameter has been updated and how the parameter is updated, the method is not suitable for checking the consistency of data depending on the path and axis specific to a machine tool.

SUMMARY OF THE INVENTION

In view of the foregoing, a technology for facilitating the management of parameters of numerical controllers is required.

The present invention provides a parameter management apparatus configured to manage parameters related to setting of a numerical controller that controls a machine tool having a plurality of drive shafts, the parameter management apparatus including: a parameter storage for storing identification information on the parameters related to the setting of the numerical controller and data of the parameters in association with each other; a comparative relationship storage for storing comparative relationship between pieces of the data stored in the parameter storage; a comparative parameter extractor for extracting pieces of data having comparative relationship from the parameters stored in the parameter storage, based on the comparative relationship stored in the comparative relationship storage; and a display processor for causing a display to display the pieces of data having the comparative relationship in association with each other.

The present invention provides a parameter management system configured to set one or more numerical controllers for controlling a machine tool having a plurality of drive shafts, the parameter management system including: a parameter storage for storing identification information on parameters related to the setting of the numerical controller and data of the parameters in association with each other; a comparative relationship storage for storing comparative relationship between pieces of the data stored in the parameter storage; a comparative parameter extractor for extracting pieces of data having comparative relationship from the parameters stored in the parameter storage, based on the comparative relationship stored in the comparative relationship storage; and a display processor for causing a display to display the pieces of data having the comparative relationship in association with each other.

According to the present invention, numerical controller parameters having comparative relationship can be easily compared.

BRIEF DESCRIPTION OF THE DRAWINGS

The above and other objects and features of the present invention will become apparent from the following description of embodiments with reference to the accompanying drawings.

DETAILED DESCRIPTION OF THE PREFERRED EMBODIMENTS

Hereinafter, an embodiment in which a function of a parameter management apparatus according to the present invention is mounted on the numerical controller 100 will be described.

Figure 1:
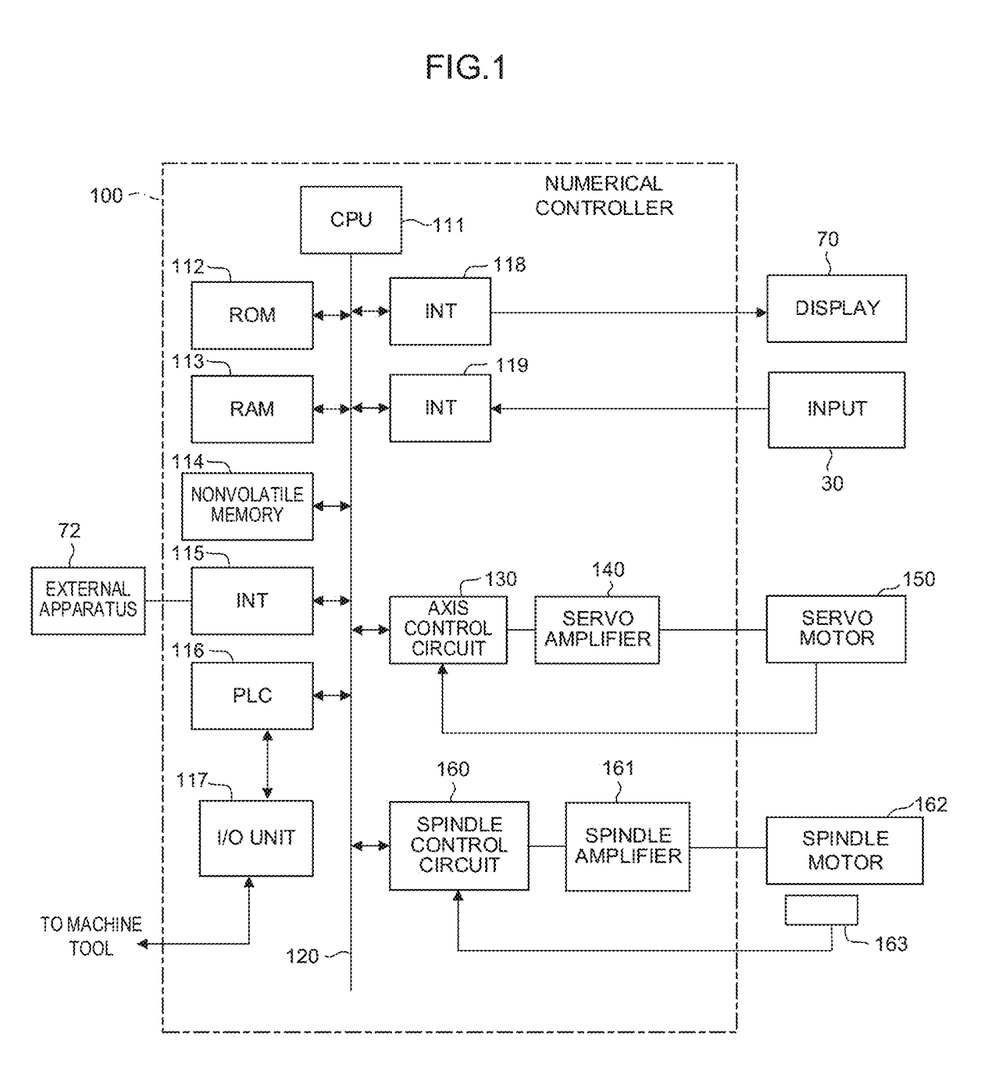
FIG. 1 is a schematic hardware configuration diagram of an embodiment of a numerical controller according to the present invention.

FIG. 1 is a schematic hardware configuration diagram illustrating a main section of a numerical controller 100 in which an embodiment of a parameter management apparatus including a machine learning device is mounted.

The numerical controller 100 includes a central processing unit (CPU) 111, a read only memory (ROM) 112, a random access memory (RAM) 113 and a nonvolatile memory 114. The numerical controller 100 further includes an interface 115, a programmable logic controller (PLC) 116, an input/output unit (I/O unit) 117 and further interfaces 118 and 119. These components are connected to each other via a bus 120. The numerical controller 100 is further connected to an external device 72 such as an adapter, a display 70 and an input 30 via the interfaces 115, 118 and 119, respectively.

The CPU 111 in the numerical controller 100 according to the present embodiment is a processor that controls the entirety of the numerical controller 100. The CPU 111 reads a system program stored in the ROM 112 via the bus 120 and controls the entire numerical controller 100 in accordance with the system program. The RAM 113 temporarily stores temporary calculation data and display data, as well as various data input by an operator via an input unit (not shown) and the like.

The nonvolatile memory 114 is configured as a memory that retains the storage state even when the power of the numerical controller 100 is turned off, for example, by being backed up by a battery (not shown). The nonvolatile memory 114 stores a program read from the external device 72 via the interface 115, a program that is input via the input 30 and various pieces of data acquired from the respective components in the numerical controller 100, a machine tool and the like (the various data being, for example, setting parameters obtained from the machine tool). The programs and various pieces of data stored in the nonvolatile memory 114 may be loaded onto the RAM 113 to be executed and used. In the ROM 112, various system programs such as a known analysis program are written in advance.

The interface 115 is a component that connects the numerical controller 100 to the external device 72. Programs, various parameters and the like are read from the external device 72 via the interface 115. Furthermore, programs, various parameters and the like edited in the numerical controller 100 can be stored via the external device 72 in an external storage. The PLC 116 inputs and outputs signals to and from a device such as a machine tool, a robot and a sensor attached to the machine tool or the robot, via the I/O unit 117 to control the device by means of a sequence program embedded in the numerical controller 100.

The display 70 receives each data loaded onto the memory, data obtained as a result of executing the program and the like, via the interface 118 to display the loaded data. The input 30 includes a manual data input (MDI), an operation panel, a touch panel and the like, to transfer commands, data and the like, based on operations performed by an operator, via the interface 119 to the CPU 111.

The numerical controller 100 further includes a shaft control circuit 130, which can perform control on each shaft of the machine tool, and a servo amplifier 140 connected to the shaft control circuit 130. Furthermore, the numerical controller 100 is connected via a servo amplifier 140 to a servomotor 150.

The shaft control circuit 130 receives a shaft movement command amount from the CPU 111 and outputs a shaft command to the servo amplifier 140. In response to this command, the servo amplifier 140 drives the servomotor 150 that moves the shaft of the machine tool. The shaft servomotor 150 has a built-in position/speed detector capable of detecting the position and speed of the shaft. With the position/speed feedback signal obtained from the position/speed detector fed back to the shaft control circuit 130, position/speed feedback control is performed. Although only one shaft control circuit 130, one servo amplifier 140 and one servomotor 150 are shown in the hardware configuration diagram of FIG. 1, the number of each of these components prepared is actually the same as the number of axes provided in the machine tool to be controlled (the number of each of the components is three for a machine tool with three straight axes and five for 5-axis processing machine).

The numerical controller 100 further includes a spindle control circuit 160 and a spindle amplifier 161 connected to the spindle control circuit 160. The numerical controller 100 is further connected via the spindle amplifier 161 to a spindle motor 162.

In response to a spindle rotation command for the spindle of the machine tool, the spindle control circuit 160 outputs a spindle speed signal to the spindle amplifier 161. In response to the spindle speed signal, the spindle amplifier 161 rotates the spindle motor 162 of the main spindle at instructed rotation speed to drive the tool. The spindle motor 162 is connected to a position coder 163. The position coder 163 outputs a feedback pulse in synchronization with the rotation of the spindle. The feedback pulse is read by the CPU 111.

Figure 2:
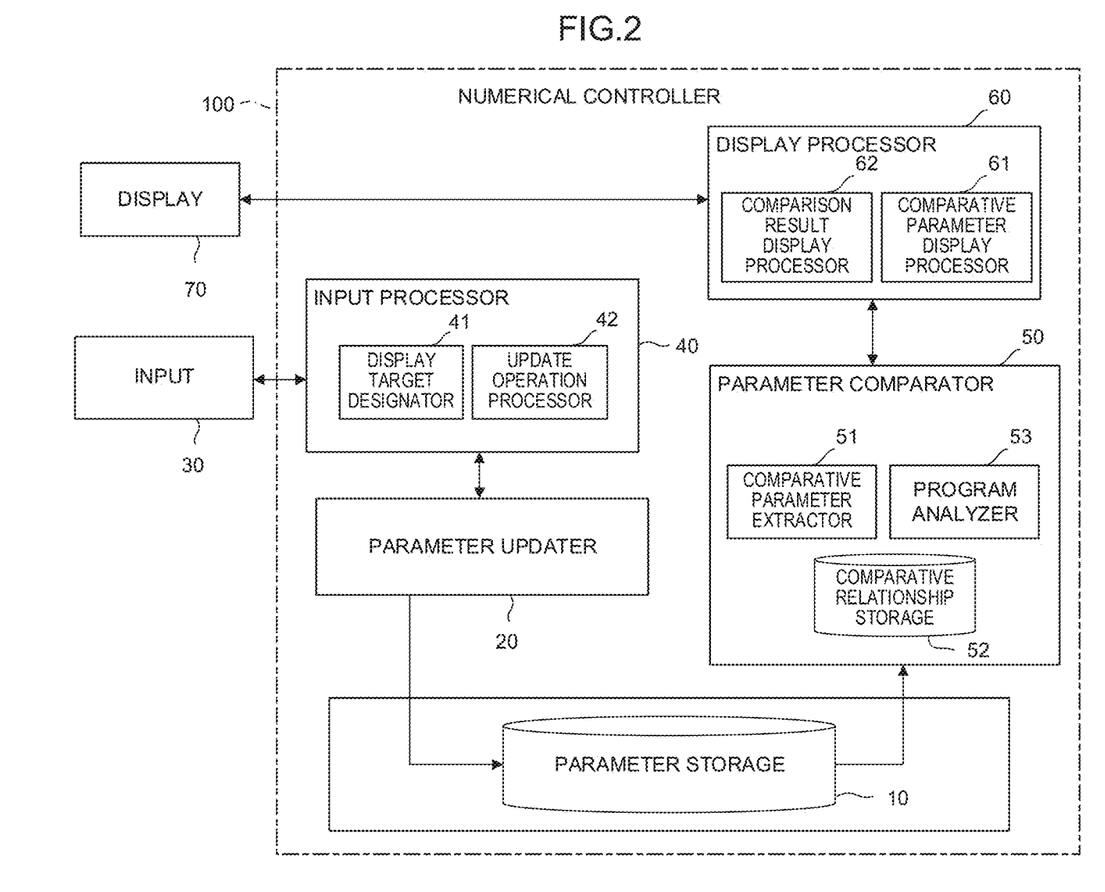
FIG. 2 is a functional block diagram of the embodiment of the numerical controller according to the present invention.

FIG. 2 is a block diagram of a main section of the embodiment of the numerical controller 100 according to the present invention. The numerical controller 100 includes a parameter storage 10 for storing parameters that have been set and a parameter updater 20 for updating the parameters stored in the parameter storage 10. The numerical controller 100 further includes: an input processor 40 for receiving an input operation performed by an operator through the input 30 including an MDI, a control panel, a touch panel or the like; a comparative parameter extractor 51 for extracting data about parameters in comparative relationship from the parameters stored in the parameter storage 10; and a display processor 60 for causing the display 70 to display the pieces of data in the comparative relationship extracted by the comparative parameter extractor 51.

The input processor 40 includes a display target designator 41 for receiving a parameter and a display format of the parameter desired by the operator or the programmer and an update operation processor 42 for receiving an operation for updating data displayed on the display 70.

The parameter storage 10 stores parameter identification information and data in association with each other, and also stores parameter identification information and a system of the machine tool in association with each other. The data stored in the parameter storage 10 mainly includes setting information of the numerical controller 100. The types of parameters stored in the parameter storage 10 include, for example, a general setting parameter, a system configuration parameter, an axis control parameter, a coordinate system parameter, a stroke confirmation parameter, a feed speed parameter, a screen display parameter, a reference position setting parameter, a servo parameter, an acceleration/deceleration parameter, a time constant parameter and an error correction parameter.

In the numerical controller 100, a parameter comparator 50 includes the comparative parameter extractor 51 and a comparative relationship storage 52. The comparative relationship storage 52 stores a comparative relationship between pieces of data stored in the parameter storage 10. The comparative parameter extractor 51 extracts pieces of data having comparative relationship from the parameters stored in the parameter storage 10, based on the comparative relationship stored in the comparative relationship storage 52. Examples of the parameter comparative relationship include a parameter related to each axis such as an axis coordinate system, a reference position, an acceleration/deceleration, a servo gain, an error tolerance, a synchronization error gain and a minimum speed/maximum speed. The parameter comparator 50 extracts the data of the parameter to be displayed according to an instruction that is input by the operator or the programmer to the input 30, and displays the data on the display 70 via a comparison result display processor 62. Although the parameters of the drive shaft are described as main examples in the present embodiment, parameters of other setting information such as a communication speed and a coordinate system can also be displayed as parameters having a comparative relationship.

The comparative relationship storage 52 stores a definition of comparative relationship between parameters. The comparative relationship storage 52 stores, for example, information in which a system of a machine tool and a drive shaft belonging to the system are associated with each other. The comparative parameter extractor 51 extracts a parameter related to the drive shaft for each system based on the comparative relationship stored in the comparative relationship storage 52.

The comparative relationship storage 52 may store the identification information on a parameter and the function of the machine tool in association with each other. For example, positioning as the function of the machine tool is associated with a shaft-related parameter such as a target position or feed speed. The comparative parameter extractor 51 extracts parameters having comparative relationship from function-related parameters, based on the comparative relationship stored in the comparative relationship storage 52.

The parameter comparator 50 further includes a program analyzer 53. When a function to be executed and parameter setting information related to the function are described in a program, the program analyzer 53 reads the program, and reads out a function instructed, by the program read, to be executed.

Next, the parameter comparator 50 reads out parameters related to the read function based on the comparative relationship stored in the comparative relationship storage 52. If values of parameters are set on the program and the set parameters have comparative relationship, the values of the parameters in the comparative relationship are read out.

The display processor 60 includes a comparative parameter display processor 61 and a comparison result display processor 62. The comparative parameter display processor 61 causes the display 70 to display the data of the parameters in the comparative relationship read by the parameter comparator 50. The comparative parameter display processor 61 compares the values of the parameters having comparative relationship. When the values of the parameters are different from each other, the comparative parameter display processor 61 further determines whether or not data values of the parameters having comparative relationship are different from each other. When the data values are different from each other, the comparative parameter display processor 61 visually indicates that the data values are different. In display screen examples shown in FIGS. 3 and 4, the background color of the display area is changed to express that the values are different.

Figure 3:
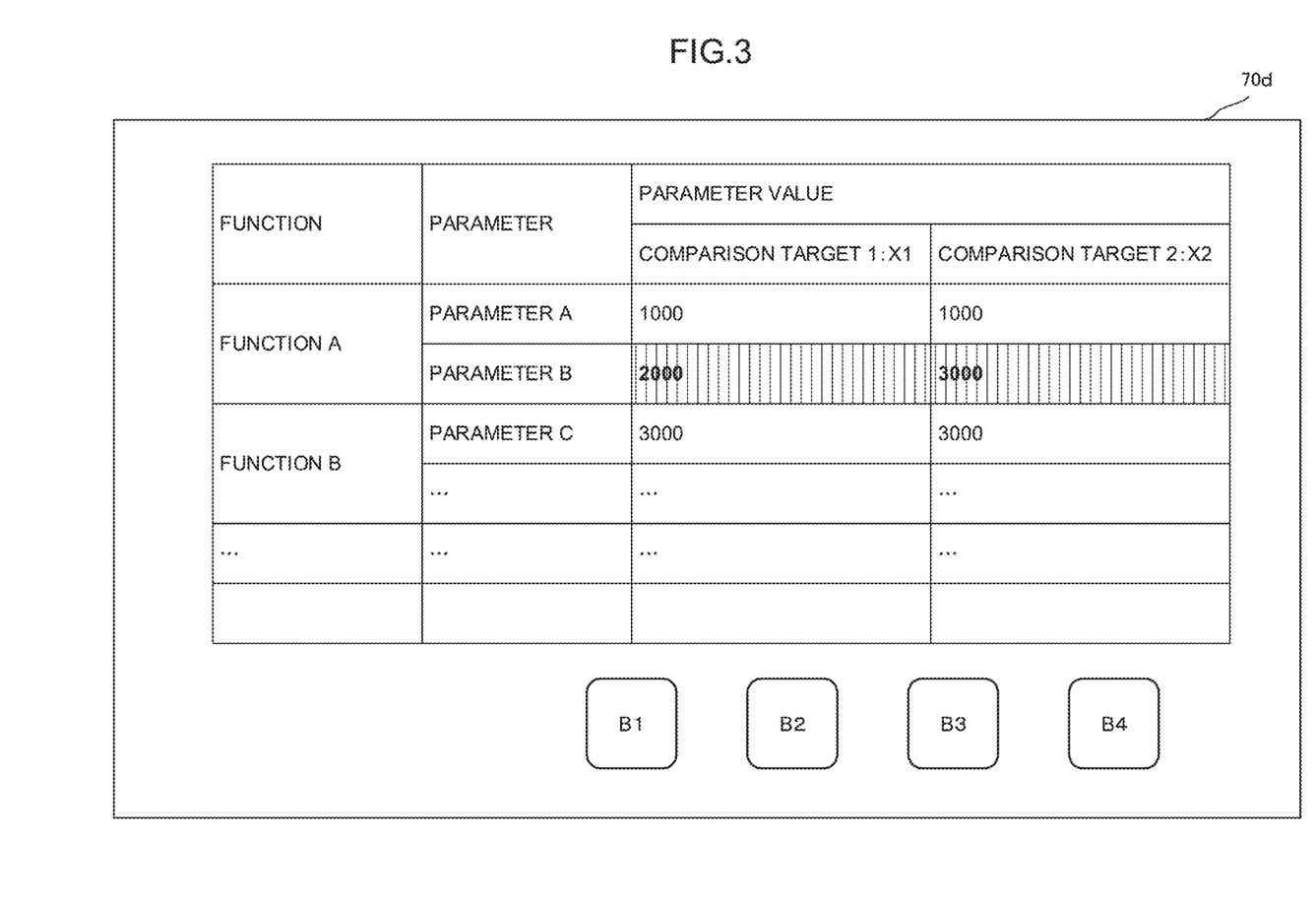
FIG. 3 illustrates an example of a screen displaying parameters having a comparative relationship.

FIG. 3 is an example in which parameters are displayed for each function, on a display screen 70d of the display 70. In the display screen 70d shown in FIG. 3, the values of two parameters, "comparison target 1: X1" and "comparison target 2: X2" are displayed in parallel for each function. The parameters related to function A are "parameter A" and "parameter B". In the parameter A, "1000" is displayed as the value of "comparison target 1: X1" and "1000" is displayed as the value of "comparison target 2: X2". In the parameter B, "2000" is displayed as the value of "comparison target 1: X1" and "3000" is displayed as the value of "comparison target 2: X2".

Because the value "2000" of "comparison target 1: X1" and the value "3000" of "comparison target 2: X2" of the parameter B are different from each other, the values are displayed with a background color different from other parameters, so that the difference in the values is visually expressed (in the Figures, the display areas are hatched).

The display screen 70d in FIG. 3 receives a cursor operation and a key input. Copy buttons are provided in a portion of the display screen 70d. In the present embodiment, four copy buttons B1 to B4 are provided on the display screen 70d. More specifically, four copy buttons B1 to B4 are provided to carry out the following operations while being operated by an operator or a programmer. The copy button B1 is for copying the value of a parameter displayed in a predetermined display area to another display area on the right side thereof. The copy button B2 is for copying the value to the left side thereof. The copy button B3 is for copying all the values displayed in display areas in a predetermined column to respective display areas on the right side. The copy button B4 is for copying all the values to the respective display areas on the left side. The operation target can be selected with the cursor operation performed by the operator or the programmer, and the selected value can be copied to the adjacent comparison target parameter. Similarly, an operator or a programmer can select an operation target by operating a cursor and input a value by key input. When the operator or the programmer performs an input operation, the update operation processor 42 in the input processor 40 receives the update content. Then, in the update operation processor 42, the parameter updater 20 updates the parameter data stored in the parameter storage 10 based on the update content input. With the parameter editing function thus provided, in this embodiment, when a new shaft is added, the set value of the existing shaft can be easily copied.

Figure 4:
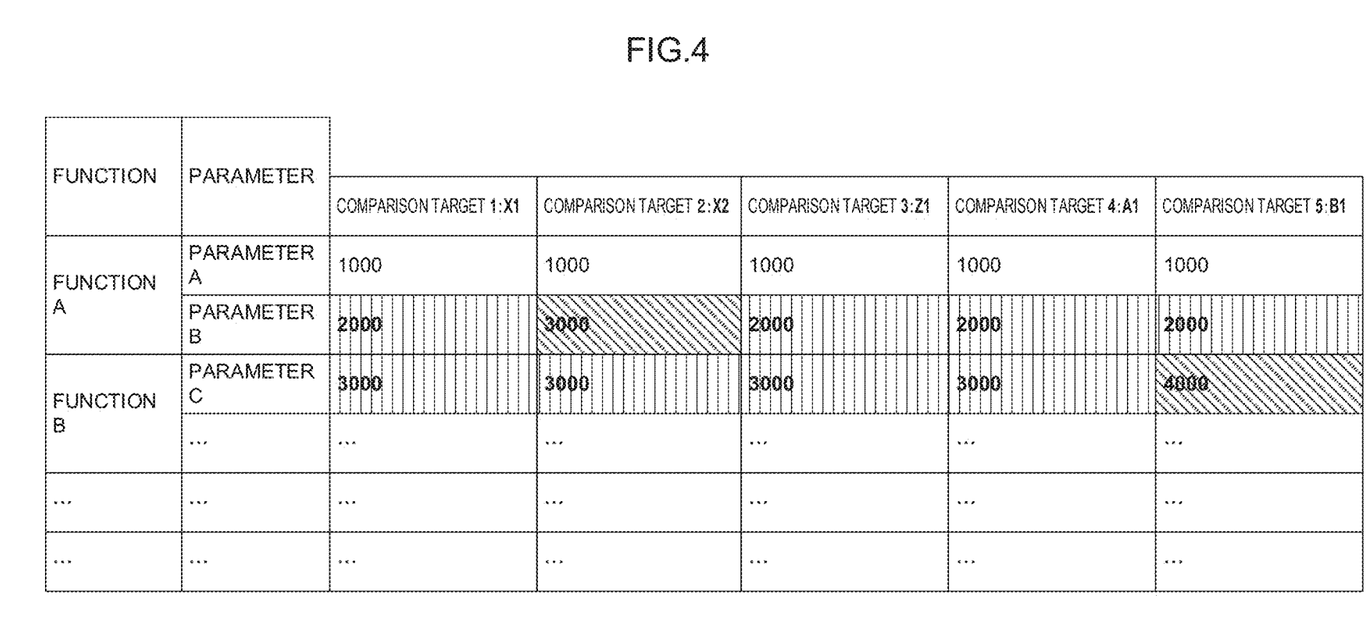
FIG. 4 illustrates another example of a screen displaying parameters having a comparative relationship.

FIG. 4 illustrates an example in which parameters are displayed for each function. FIG. 4 illustrates five parameters "comparison target 1: X1", "comparison target 2: Y1", "comparison target 3: Z1", "comparison target 4: A1" and "comparison target 5: B1" for each function. In this case, parameters are displayed for five axes by including axes A and B as well as three axes X, Y and Z. In the parameter B, only the value of "comparison target 2: Y1" is "3000". The values of the remaining parameters, that is "comparison target 1: X1", and "comparison target 3: Z1" to "comparison target 5: B1" are "2000".

Different colors and/or different color tones may be used for displaying display areas including parameters with different values (display areas with values of the parameters B and C in the example shown in FIG. 4), and display areas with different values in the parameters (in the example shown in FIG. 4, display areas for comparison target 2: Y1 in the parameter B and comparison target 5: B1 in the parameter C). For example, display areas may be displayed in different colors with the parameter display areas including a parameter having different value may be displayed in light yellow, and the display area with a different value may be displayed in dark yellow.

As illustrated in FIG. 4, comparison targets are not limited to two targets, and comparisons over all the shafts and all the systems may be performed. Parameters may be classified for each system. In addition, systems may be colored in different colors to be visually expressed.

Figure 5:
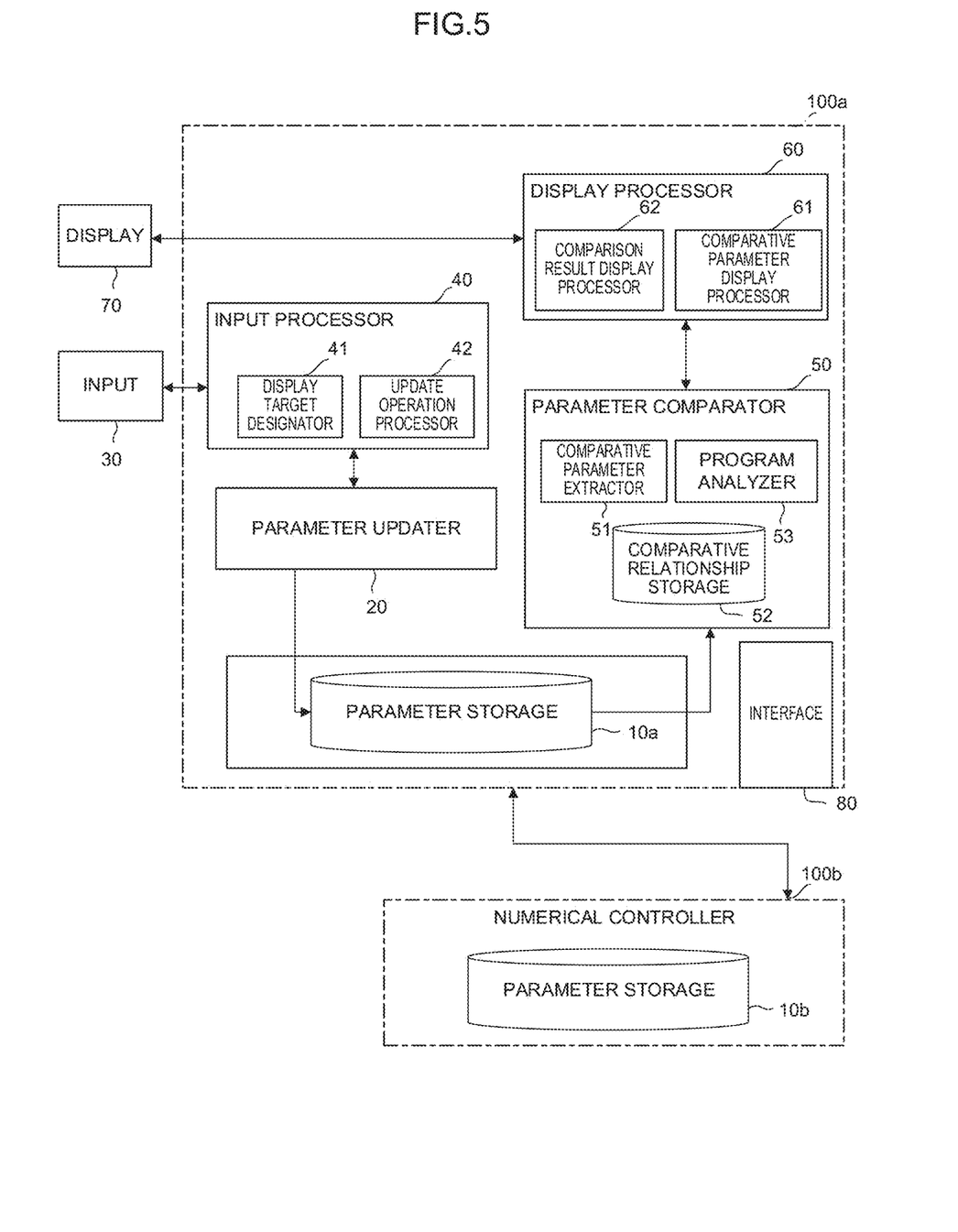
FIG. 5 is a functional block diagram of an embodiment of a numerical controller that manages parameters of a plurality of numerical controllers.

FIG. 5 is a diagram illustrating a numerical controller 100a on which the parameter management apparatus is mounted. The configuration of the numerical controller 100a in FIG. 5 is substantially similar to that of the numerical controller 100 in FIG. 2, and the similar components are indicated by the same reference numerals. The numerical controller 100a in FIG. 5 has an external interface 80 not included in the numerical controller 100 in FIG. 2. The numerical controller 100a is connected from the external interface 80 via a network and a signal line to an external numerical controller 100b. The external numerical controller 100b includes a parameter storage 10b for storing parameter identification information on the external numerical controller 100b and parameter data. The numerical controller 100a in which the parameter management apparatus is mounted reads out parameter data of the external numerical controller 100b and manages the data together with its own parameters. That is, according to the embodiment of FIG. 5, one numerical controller 100a can manage the parameters of a plurality of numerical controllers 100a and 100b.

Figure 6:
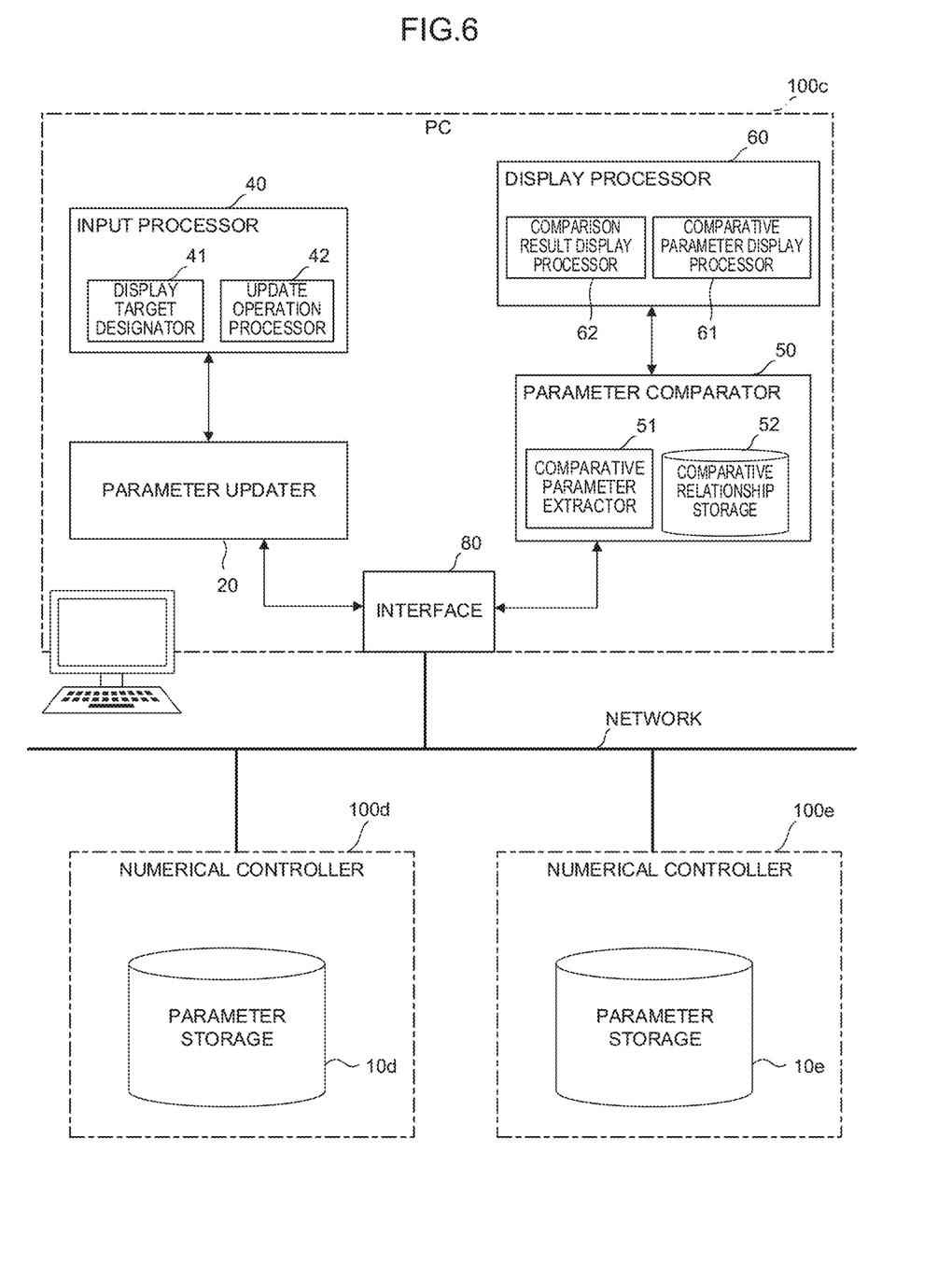
FIG. 6 is a functional block diagram of a personal computer (PC) that manages parameters of a plurality of numerical controllers connected to a network.

FIG. 6 is a diagram in which the parameter management apparatus according to the present invention is mounted on a personal computer (PC) 100c. The PC 100c in FIG. 6 includes: an input processor 40 including a display target designator 41 and an update operation processor 42; a parameter updater 20; a display processor 60 including a comparative parameter display processor 61 and a comparison result display processor 62; a parameter comparator 50 including a comparative parameter extractor 51 and a comparative relationship storage 52; and an external interface 80. The PC 100c is connected to external numerical controllers 100d and 100e through a network. The external numerical controller 100d has a storage area in which a parameter storage 10d is included. Similarly, the external numerical controller 100e has a storage area in which a parameter storage 10e is included. The parameter storages 10d and 10e each store parameter identification information and parameter data of a corresponding one of the numerical controllers 100d and 100e.

The display target designator 41 in the input processor 40 receives designation of a parameter display format from an operator or a programmer via a keyboard or a mouse of the PC. The parameter display format indicates a unit with which parameters are associated, such as for each drive shaft, each system, and each function. By combining these, data may be displayed for each function and drive shaft as shown in FIG. 3. The comparative parameter extractor 51 in the parameter comparator 50, reads parameters having comparative relationship from the parameter storages 10d and 10e in the numerical controllers 100d and 100e on the network, based on the comparative relationship between the display format designated by the display target designator 41 and the parameters stored in the comparative relationship storage 52. The PC 100c shown in FIG. 6 is connected to both of the two numerical controllers 100d and 100e. The PC 100c further displays the parameters of the individual numerical controllers 100d and 100e in parallel. Thus, the PC 100c can concurrently manage the parameters on the plurality of numerical controllers 100d and 100e.

Figure 7:
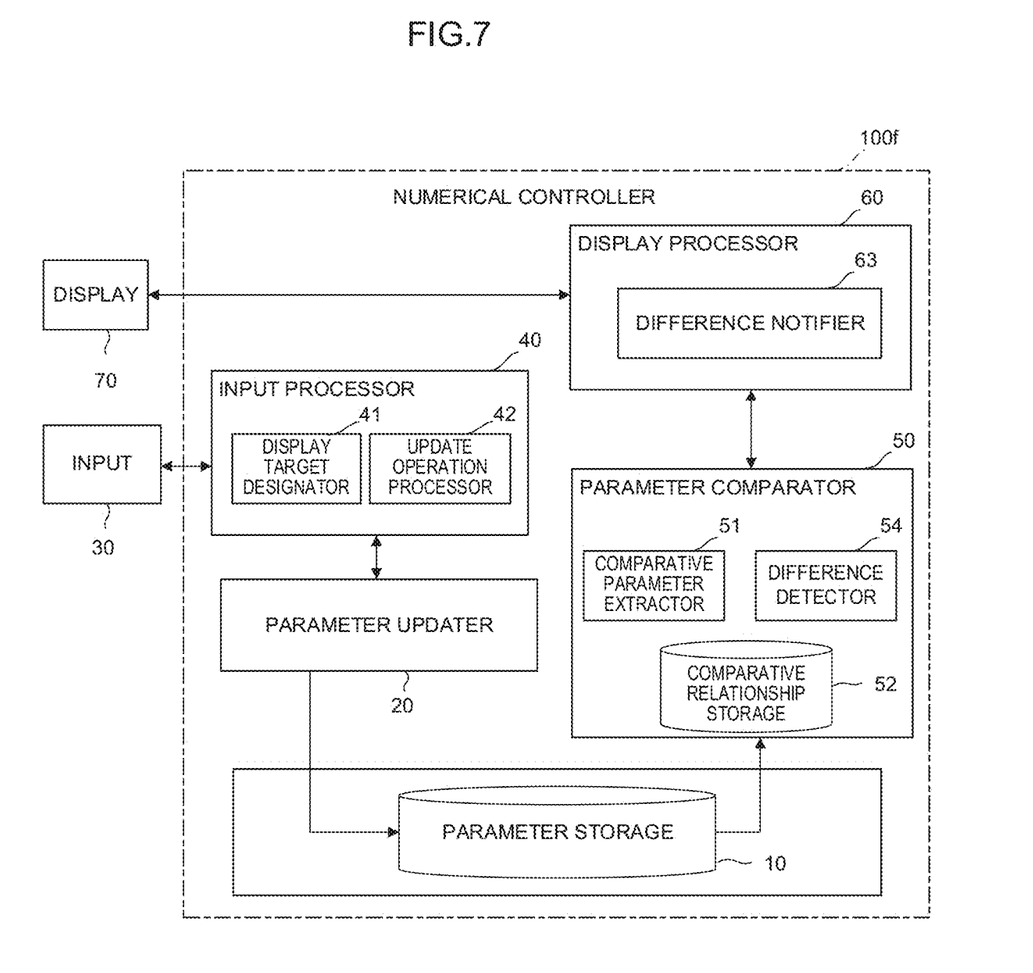
FIG. 7 is a functional block diagram of an embodiment of a numerical controller including a difference detector and a difference notifier.

FIG. 7 is a diagram illustrating a numerical controller 100f in which one embodiment of the parameter management apparatus according to the present invention is mounted. In particular, the numerical controller 100f in FIG. 7 includes a difference detector 54 and a difference notifier 63. The difference detector 54 compares the values of the parameters extracted by the comparative parameter extractor 51.

The difference notifier 63 causes the display 70 to display the difference between the parameter values. The numerical controller 100f in FIG. 7 displays the difference itself between the values, instead of providing visual expression for the parts with different parameter values.

Figure 8:
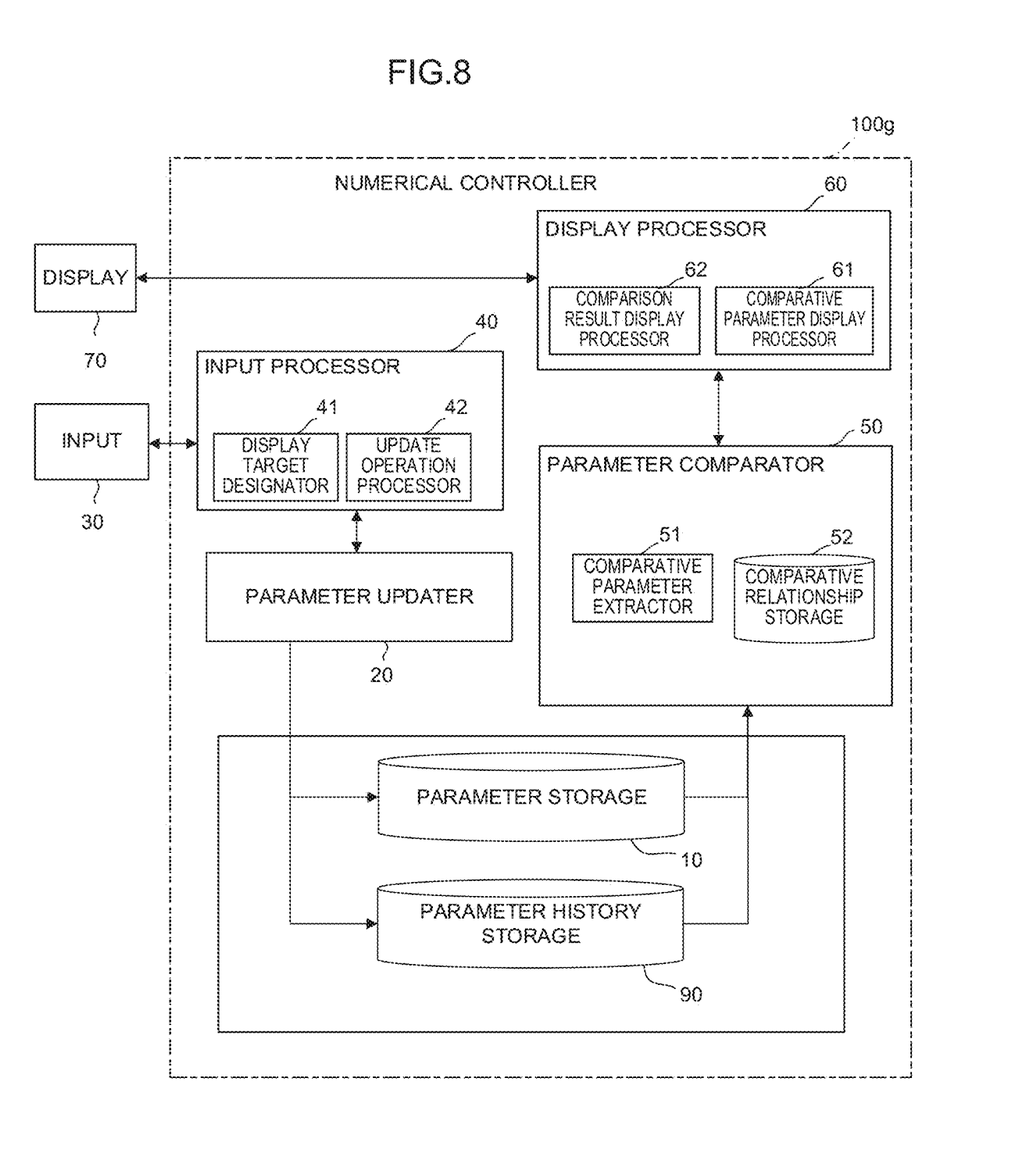
FIG. 8 is a functional block diagram of an embodiment of a numerical controller that compares a parameter set in the past with a current parameter.

FIG. 8 is a diagram illustrating a numerical controller 100g in which an embodiment of the parameter management apparatus according to the present invention is mounted. The numerical controller 100g in FIG. 8 includes a parameter history storage 90 for storing parameters set in the past, in addition to the parameter storage 10 for storing parameters currently set. The comparative parameter extractor 51 of the parameter comparator 50 compares a parameter set in the past with a parameter currently set. When there is a difference between a value set in the past and a value currently set, the comparison result display processor 62 of the display processor 60 causes the display 70 to display the parameters so that which of the parameter is different can be visually recognized. The values set in the past are, for example, the default parameters set by the machine tool manufacturer at the time of shipment, the parameters at the time of turning ON the numerical controller 100g before the settings are changed, or a history of parameters with time designated such as a day, a week, or a month. The comparative parameter extractor 51 compares the history parameter and the parameter currently set, so that the settings can be inspected through the comparison between the parameter values when the parameters are unintentionally changed or when only one shaft is not appropriately operating.

Figure 9:
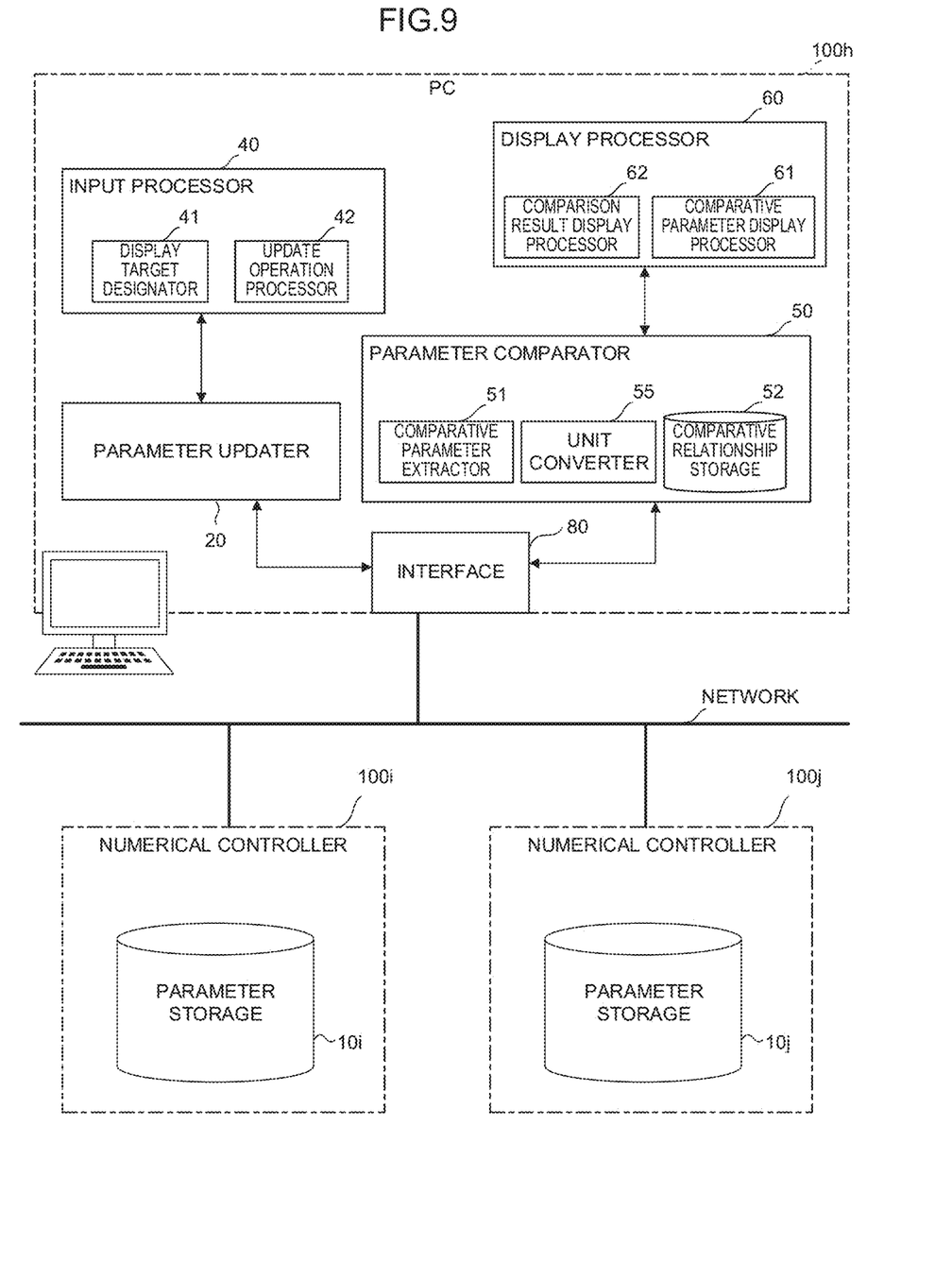
FIG. 9 is a functional block diagram of a PC having a value unit converter.

FIG. 9 is a diagram illustrating a PC 100h in which the parameter management apparatus according to the present invention is mounted. The PC 100h illustrated in FIG. 9 includes: an input processor 40 including a display target designator 41 and an update operation processor 42; a parameter updater 20; a parameter comparator 50 including a comparative parameter extractor 51, a comparative relationship storage 52 and a unit converter 55; a display processor 60 including a comparison result display processor 62 and a comparative parameter display processor 61; and an external interface 80. The PC 100*h* is connected via a network to external numerical controllers 100*i* and 100*j*.

The unit converter 55 converts values of parameters in different units. Examples of the parameters in different units include parameters in metric system and in inches, and parameters of IS-A and IS-B machine tools with different set units. The PC 100*h* shown in FIG. 9 includes the unit converter 55 as described above so that even when the setting units of the numerical controllers as the parameter management targets are different, the comparison can be performed based on the same unit.

Some embodiments of the present invention are been described above, but the present invention is not limited to the above-described embodiments, and may be modified as appropriate to be implemented in various modes.

For example, the parameter management apparatus 100 can be configured to handle, as comparison targets, parameters set in the past in a plurality of numerical controllers connected to the network.

Figure 10:
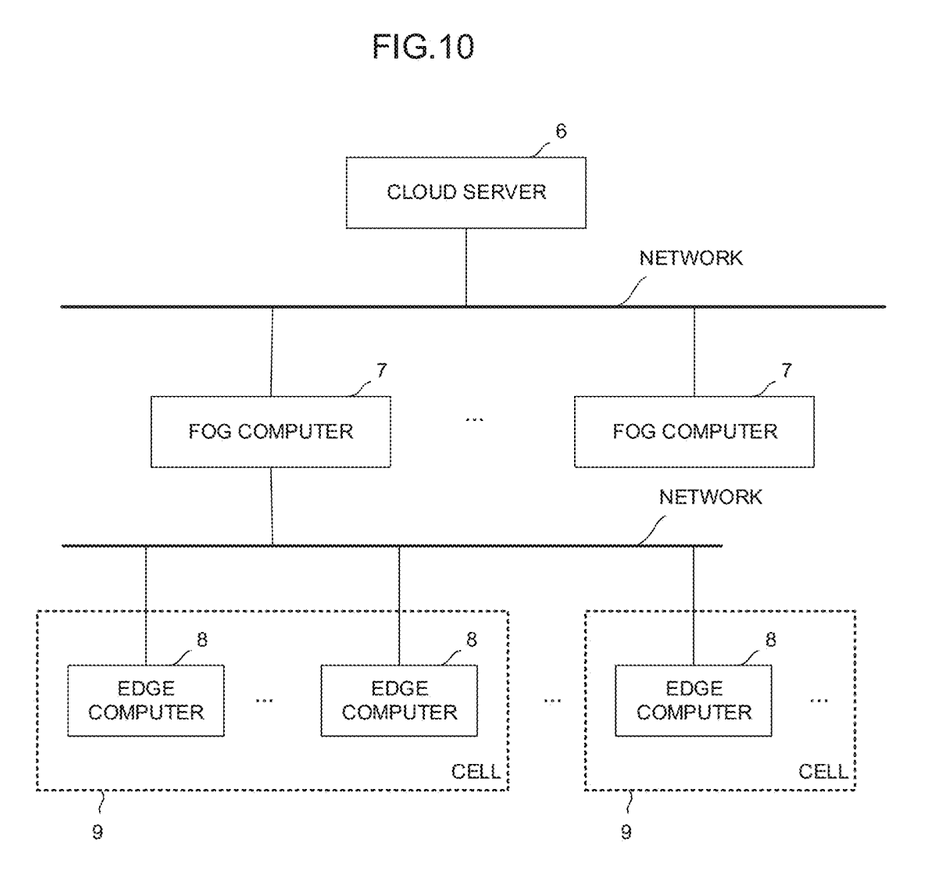
FIG. 10 is a diagram illustrating an example of a three-layer system including a cloud server, a fog computer and an edge computer.

Referring to FIG. 10, an embodiment is described in which the parameter management apparatus 100 stated above is mounted as a portion of a system in which the management apparatus 100 is mutually connected with a plurality of apparatuses including a cloud server 6, a fog computer 7 and an edge computer (such as a robot controller or a numerical controller) 8, via a wired or wireless network. FIG. 10 is a diagram illustrating a network system in which the edge computers 8 such as numerical controllers arranged in respective factories are managed by the fog computer 7 and the cloud server 6. The parameter management apparatus 100 according to the present invention is mounted on a layer including the cloud server 6 and the like, on any of the fog computer 7 and the edge computer 8 in a system based on hierarchical network connection of each of a plurality of devices. Data can be mutually shared with the plurality of apparatuses via a network, so that the data reuse between the elements and the like can be actualized. In the system illustrated in FIG. 10, a plurality of cells 9 are provided factories various locations, and each cell 9 is managed by the fog computer 7 on the higher layer in a predetermined unit (for each factory, for each set of a plurality of factories of the same manufacturer, for example). The data collected and analyzed by the fog computers 7 is collected and analyzed by the cloud server 6 on an even higher layer. The resultant information can be used by each edge computer 8.

Figure 11:
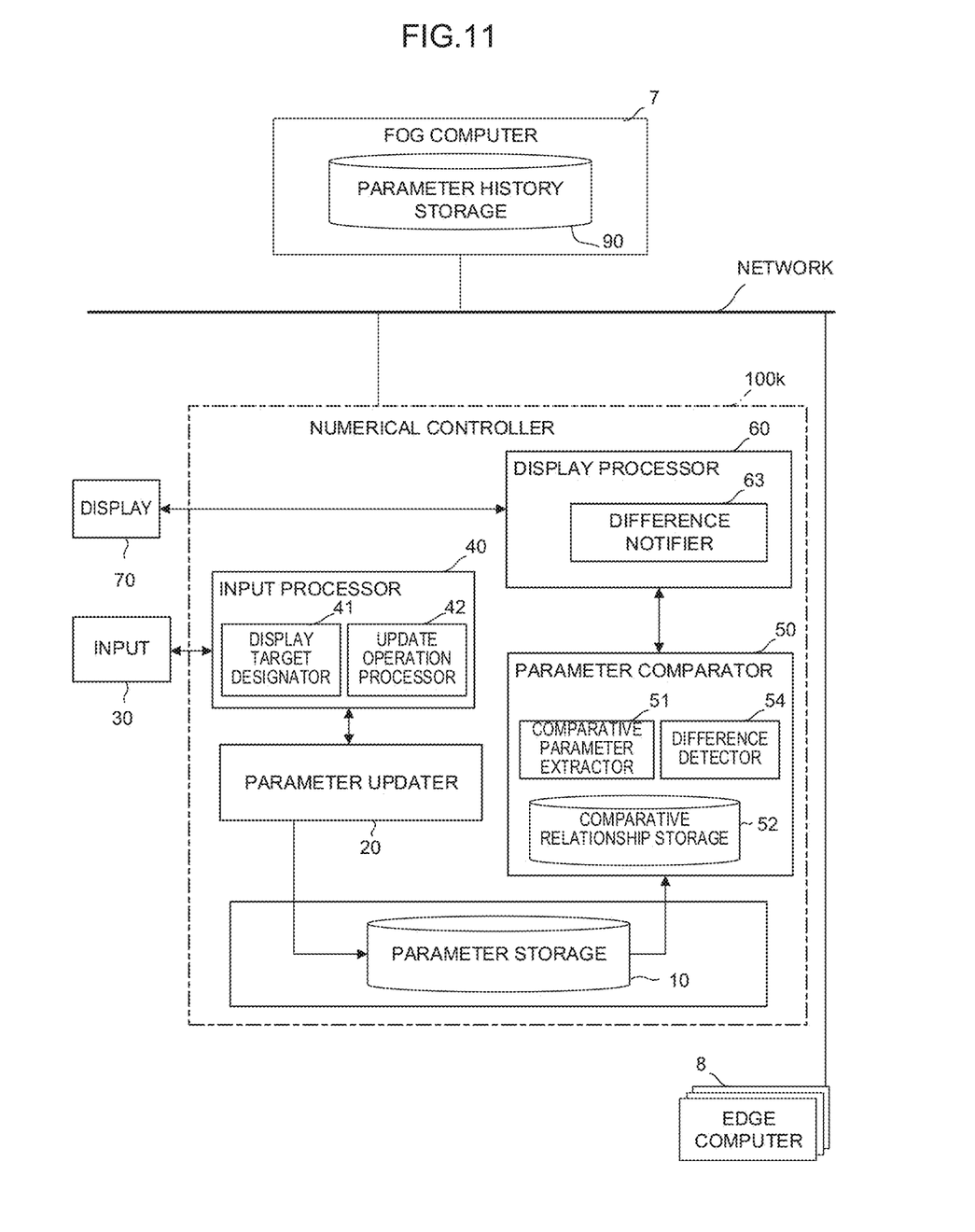
FIG. 11 is a functional block diagram of an embodiment of a numerical controller for performing comparison with a parameter stored in a parameter history storage arranged in a fog computer.

In this configuration, as shown in FIG. 11, a parameter history storage 90 may be mounted on the fog computer 7, and information on parameters set by a plurality of edge computers 8 (such as numerical controllers or robot controllers) may be collected and then stored. The parameter history storage 90 may store in combination, the parameters set for each edge computer 8 and the operation quality as a result of operating the edge computer based on the parameters (such as machining quality of a workpiece when the parameters are set and machining operation is performed). A numerical controller 100*k* acquires the parameters stored in the parameter history storage 90 and displays them in comparison with the parameters set in the numerical controller 100*k* as in the above-described embodiment, so that the parameters set to the numerical controller 100*k* can be easily refined.

Figure 12:
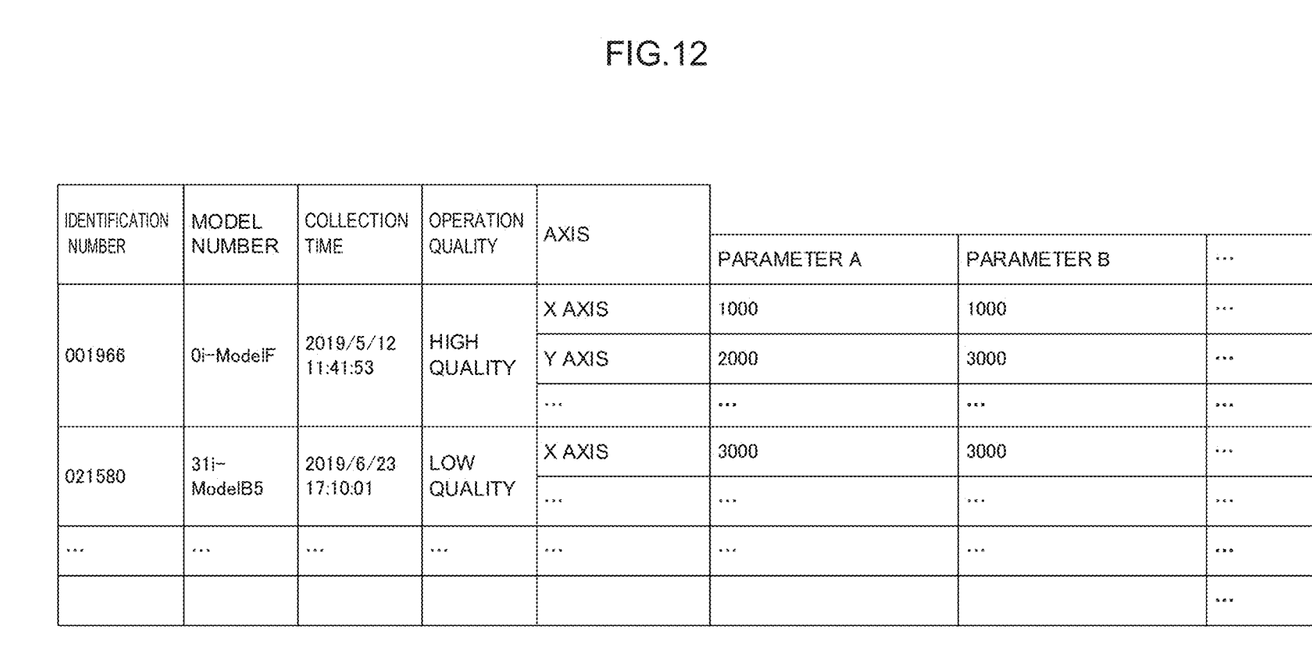
FIG. 12 is a diagram illustrating an example of parameters stored in the parameter history storage shown in FIG. 11.

The above embodiment will be described in more detail. FIG. 12 is a diagram showing an example of parameters stored in the parameter history storage 90 according to the present embodiment. The parameter history storage 90 stores, for example, parameter information in which parameter values set during the operation of each machine, collected from the edge computer 8 such as a numerical controller that controls a machine tool or a robot controller that controls a robot is associated with information related to the operation quality as a result of operating the machine using the parameters. The parameter information may include information on the model number of the machine or the control device, the collection time of the parameter information, and the like.

When the displaying of similar parameter values is instructed by an operation of the operator, the numerical controller 100*k* reads, from the parameter history storage 90 provided in the fog computer 7 via the network, a value of a parameter related to the machine to be controlled by the numerical controller 100*k* and the parameter information to be compared. The parameter information to be compared with the parameter of the machine to be controlled by the numerical controller 100*k* may be parameter information acquired from a machine or a controller having the same or similar function or configuration. The machine or controller having the same or similar functions and configuration may be specified based on information such as a model number.

Next, the parameter comparator 50 in the numerical controller 100*k* identifies parameter information similar to the parameters set in the numerical controller 100*k* among the pieces of parameter information acquired from the fog computer 7. For the parameter information similar to the parameters set in the numerical controller 100*k*, for example, similarity may be defined by a calculation method with which a higher similarity is obtained with a shorter distance between the parameter set in the numerical controller 100*k* and the respective parameter information, based on vectors using the respective parameters as elements. Furthermore, as the calculation method for defining the similarity, a method may be used in which each parameter is weighted, and parameter information closer to the parameter that is likely to affect the operation quality is provided with a higher similarity.

Then, the display processor 60 in the numerical controller 100*k* displays the parameters set in the numerical controller 100*k* and at least one parameter information having a high degree of similarity in a comparable manner. In this process, as in the other embodiments, the difference notifier 63 performs displaying so that a parameter with a different parameter value can be recognized. As described above, preferably, a configuration is employed in which among the pieces of parameter information resulted in high operation quality, a parameter similar to the parameter currently set in the numerical controller 100*k* is set as a comparison target, and the parameter with a parameter value is different from the currently set value is displayed to the operator. By adopting such a configuration, the numerical controller 100*k* can assist the operator in considering which parameter value should be changed and how to improve the operation quality of the machine from the current quality.

Note that the parameter history storage 90 may be provided on the cloud server 6. With this configuration, it is possible to collect the pieces of parameter information from a wider range of edge computers 8 as compared with the case where the parameter history storage 90 is not provided on the cloud server 6, so that more pieces of parameter information can be presented to the numerical controller 100k.

According to the above-described embodiment, in a system in which various cloud servers 6, fog computers 7 and edge computers 8 are connected to each other, high-quality parameter information used in each edge computer 8 can be collected and managed. In particular, according to the above-described embodiment, a parameter value similar to the parameter value currently set in the numerical controller 100k can be displayed to be compared with a parameter value corresponding to good operation quality. Thus, a clue to improve the current parameter setting (in other words, for improving operation quality) can be easily provided to the operator.

The invention claimed is:

1. A parameter management apparatus configured to manage parameters related to setting of a numerical controller that controls a machine tool having a plurality of drive shafts, the parameter management apparatus comprising:
a parameter storage for storing identification information on the parameters related to the setting of the numerical controller and data of the parameters, wherein the identification information and the data are stored in relation to each other;
a comparative relationship storage for storing comparative relationship between pieces of the data stored in the parameter storage;
a comparative parameter extractor configured to extract the pieces of the data having comparative relationship from the parameters stored in the parameter storage, based on the comparative relationship stored in the comparative relationship storage;
a parameter comparator configured to compare the pieces of the data having the comparative relationship, wherein the pieces of the data include a function of the numerical controller and the plurality of drive shafts driven by the function; and
a display processor configured to cause a display to display the pieces of the data having the comparative relationship in relation to each other, wherein
the display processor is configured to cause the display to display the pieces of the data including the function of the numerical controller, the plurality of drive shafts driven by the function, the parameters of the function, and values of the parameters of the function, and
indicate a value of the values of the parameters of the function being different from other values of the values of the parameters of the function as a result of comparison by the parameter comparator, and
the parameter management apparatus is configured to manage the parameters to control the machine tool having the plurality of drive shafts.

2. The parameter management apparatus according to claim 1, wherein
the comparative relationship storage stores further identification information on further parameters related to the plurality of drive shafts, and
the comparative parameter extractor is configured to extract the pieces of the data related to the plurality of drive shafts based on the further identification information.

3. The parameter management apparatus according to claim 2, wherein the comparative relationship storage stores one or more systems and the plurality of drive shafts belonging to the one or more systems, wherein the one or more systems and the plurality of drive shafts are stored in relation to each other, and
the comparative parameter extractor is configured to extract further data related to the plurality of drive shafts belonging to the one or more systems.

4. The parameter management apparatus according to claim 2, wherein
the comparative relationship storage stores the function of the numerical controller and a drive shaft of the plurality of drive shafts driven by the function, wherein the function of the numerical controller and the drive shaft are stored in relation to each other, and
the comparative parameter extractor is configured to extract further data on the drive shaft driven by the function.

5. The parameter management apparatus according to claim 1, wherein the display processor is configured to cause the display to display different data as the result of comparison by the parameter comparator.

6. The parameter management apparatus according to claim 5, wherein
the parameter storage stores a parameter set in the past,
the parameter comparator is configured to compare the parameter set in the past with a current parameter, and
the display processor is configured to cause the display to display different data as the result of comparison by the parameter comparator.

7. The parameter management apparatus according to claim 1, further comprising:
an input processor configured to receive a change operation on the pieces of the data displayed by the display; and
a parameter updater configured to update the data stored in the parameter storage in accordance with the change operation.

8. The parameter management apparatus according to claim 7, wherein
the input processor is configured to receive an addition operation of a drive shaft of the plurality of drive shafts, and
the parameter updater is configured to newly store further data on the drive shaft in the parameter storage in accordance with the addition operation.

9. The parameter management apparatus according to claim 1, further comprising a unit converter configured to, in response to the parameters having comparative relationship being in different units, convert the units of the parameters.

10. A parameter management system configured to set a plurality of numerical controllers each for controlling a corresponding machine tool having a plurality of drive shafts, the parameter management system comprising:
a parameter storage for storing identification information on parameters related to the setting of each numerical controller of the plurality of numerical controllers and data of the parameters, wherein the identification information and the data are stored in relation to each other;
a comparative relationship storage for storing comparative relationship between pieces of the data stored in the parameter storage;
a comparative parameter extractor configured to extract the pieces of the data having comparative relationship from the parameters stored in the parameter storage, based on the comparative relationship stored in the comparative relationship storage;

a parameter comparator for comparing the pieces of the data having the comparative relationship, wherein the pieces of the data include a function of said each numerical controller and the plurality of drive shafts of the corresponding machine tool driven by the function; and a display processor for causing a display to display the pieces of the data having the comparative relationship in relation to each other, wherein the display processor is configured to cause the display to display the pieces of the data including the function of said each numerical controller, the plurality of drive shafts of the corresponding machine tool driven by the function, the parameters of the function, and values of the parameters of the function, and indicate a value of the values of the parameters of the function being different from other values of the values of the parameters of the function as a result of comparison by the parameter comparator, and the parameter management system is configured to manage the parameters to control the corresponding machine tool having the plurality of drive shafts.

11. The parameter management system according to claim 10, wherein the comparative relationship storage stores further identification information on further parameters related to the plurality of drive shafts of the corresponding machine tool, and the comparative parameter extractor is configured to extract the pieces of the data related to the plurality of drive shafts of the corresponding machine tool based on the further identification information.

12. The parameter management system according to claim 10, wherein the display processor is configured to cause the display to display different data as the result of comparison by the parameter comparator.

13. The parameter management system according to claim 10, further comprising:

an input processor configured to receive a change operation on the pieces of the data displayed by the display; and a parameter updater configured to update the data stored in the parameter storage in accordance with the change operation.

14. The parameter management system according to claim 10, further comprising a unit converter configured to, in response to the parameters having comparative relationship being in different units, convert the units of the parameters.

15. The parameter management apparatus according to claim 1, wherein the parameters stored in the parameter storage include a general setting parameter, a system configuration parameter, an axis control parameter, a coordinate system parameter, a stroke confirmation parameter, a feed speed parameter, a screen display parameter, a reference position setting parameter, a servo parameter, an acceleration/deceleration parameter, a time constant parameter and an error correction parameter.

16. The parameter management system according to claim 10, wherein the parameters stored in the parameter storage include a general setting parameter, a system configuration parameter, an axis control parameter, a coordinate system parameter, a stroke confirmation parameter, a feed speed parameter, a screen display parameter, a reference position setting parameter, a servo parameter, an acceleration/deceleration parameter, a time constant parameter and an error correction parameter.

* * * * *